(12) United States Patent
Ohno et al.

(10) Patent No.: US 6,449,539 B1
(45) Date of Patent: Sep. 10, 2002

(54) SELF-DIAGNOSIS SYSTEM FOR VEHICLE AND DIAGNOSIS METHOD USING SAME

(75) Inventors: Yoshinori Ohno; Tateo Kume, both of Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,344

(22) Filed: May 19, 2000

(30) Foreign Application Priority Data

May 25, 1999 (JP) ............................................ 11-144787

(51) Int. Cl.⁷ ......................... G01M 17/00; G06F 19/00
(52) U.S. Cl. ........................... 701/31; 701/29; 701/32; 340/439; 340/459
(58) Field of Search .............................. 701/29, 31, 33, 701/32, 35, 66, 97; 340/439, 459, 825.15, 931

(56) References Cited

U.S. PATENT DOCUMENTS

| | | | | |
|---|---|---|---|---|
| 4,267,569 A | * | 5/1981 | Baumann et al. | 701/29 |
| 5,515,272 A | * | 5/1996 | Sakai et al. | 701/29 |
| 5,565,856 A | * | 10/1996 | Takaba et al. | 701/29 |
| 5,757,645 A | * | 5/1998 | Schneider et al. | 701/29 |
| 6,006,146 A | * | 12/1999 | Usui et al. | 701/29 |
| 6,134,488 A | * | 10/2000 | Sasaki et al. | 701/31 |
| 6,285,931 B1 | * | 9/2001 | Hattori et al. | 701/29 |

* cited by examiner

*Primary Examiner*—Gertrude Arthur

(57) ABSTRACT

A self-diagnosis system for a vehicle, with which it is possible, without requiring skill and practice, to realize running according to a running pattern and easily and certainly cause an ECU to execute a self-diagnosis. The self-diagnosis system comprises: a vehicle state detecting unit for detecting a vehicle state; a data processing unit for executing a diagnosis of a diagnosis object device on the basis of a predetermined running pattern preset in correspondence with the diagnosis object device and a vehicle state detected by the vehicle state detecting unit when running according to the running pattern is carried out; and a diagnosis data processing unit, data-transferably connected to the data processing unit, for obtaining and displaying data from the data processing unit, and under a condition that the diagnosis data processing unit is data-transferably connected to the data processing unit and the vehicle is run in a predetermined running pattern corresponding to a diagnosis object device in order to execute a diagnosis to the diagnosis object device, the diagnosis data processing unit displays that an execution condition is established when the execution condition of the diagnosis corresponding to the running pattern is established.

14 Claims, 5 Drawing Sheets

SELF-DIAGNOSIS SYSTEM FOR VEHICLE AND DIAGNOSIS METHOD USING SAME

FIELD OF THE INVENTION

This invention relates to a self-diagnosis system for diagnosing failures of devices mounted in a vehicle, and to a diagnosis method using this self-diagnosis system.

BACKGROUND OF THE INVENTION

Recently, restrictions on automotive vehicles relating to emissions have been becoming more and more strict. For example, in vehicle certification regimes being implemented in North America and elsewhere, tests of devices provided in vehicles for preventing emissions, such as leak tests on evaporative emission purging devices and cleaning performance tests on catalysts, are being made obligatory. Because these tests must be carried out with the vehicle in an operating state such that the devices constituting the objects of the tests can function normally, in the case of North America, self-diagnosis programs are being provided in vehicle ECU (Electronic Control Unit); diagnosis is then carried out automatically when the vehicle is running in any of a number of running patterns set in correspondence with different test objects, and the results of the diagnoses are stored.

These running patterns are sometimes followed by coincidence during the ordinary travel of the vehicle by a user. In this case the ECU executes diagnoses and stores diagnosis results one by one. Then, at the time of a vehicle certification check, a service engineer at a dealer or the like reads out the diagnosis results from the ECU, and for any device for which a 'normal' determination has not been obtained, runs the vehicle in accordance with the corresponding running pattern deliberately and thereby causes the ECU to perform a diagnosis. When the diagnosis result is 'fail', the service engineer deals with the problem by performing a repair. Tests on repaired devices are also carried out in the same way; that is, the ECU is caused to execute each test by the vehicle being run in accordance with a respective running pattern.

However, in a self-diagnosis system of the related art, the service engineer had no way whatsoever of knowing, during the execution of a running pattern, whether or not the self-diagnosis by the ECU has started, or whether or not self-diagnosis has finished, there has been no alternative, but to judge the timing of starting and finishing of running for the self-diagnosis by conjecture. To execute a running pattern, it is necessary for the vehicle speed and throttle aperture and so on to be controlled exactly in relation to elapsed time. Therefore, the service engineer had to control the operation of the vehicle while simultaneously looking at a running pattern set out for example in a service manual and at a stopwatch, and consequently has needed skill and practice. For these reasons, it has often happened that actual running of the vehicle deviates from the running pattern, and the self-diagnosis fails and has to be repeated, and thus the process has not been efficient.

SUMMARY OF THE INVENTION

It is, therefore, an object of the present invention to provide a self-diagnosis system for a vehicle with which it is possible, without needing skill and practice, to realize running according to a running pattern, and thereby easily and certainly cause an ECU to perform a self-diagnosis.

To achieve this object and other objects, a self-diagnosis system for a vehicle provided by the invention includes vehicle state detecting means for detecting a vehicle state; data processing means for executing a diagnosis of a diagnosis object device on the basis of a predetermined running pattern preset in correspondence with the diagnosis object device and a vehicle state detected by the vehicle state detecting means when running according to the running pattern is carried out; and diagnosis data processing means, data-transferably connected to the data processing means, for obtaining and displaying data from the data processing means. On a condition that the diagnosis data processing means is data-transferably connected to the data processing means and the vehicle is run in a predetermined running pattern corresponding to a diagnosis object device in order to execute a diagnosis to the diagnosis object device, the diagnosis data processing means displays that an execution condition is established when the execution condition of the diagnosis corresponding to the running pattern is established.

Another self-diagnosis system provided by the invention includes vehicle state detecting means for detecting a vehicle state; data processing means for executing a diagnosis of a diagnosis object device on the basis of a predetermined running pattern preset in correspondence with the diagnosis object device and a vehicle state detected by the vehicle state detecting means when running according to the running pattern is carried out; and diagnosis data processing means, data-transferably connected to the data processing means, for obtaining and displaying data from the data processing means. When the diagnosis data processing means is data-transferably connected to the data processing means and the vehicle is run in a predetermined running pattern corresponding to a diagnosis object device in order to execute a diagnosis of the diagnosis object device, the diagnosis data processing means displays an operating sequence necessary for realizing the running pattern. At this time, the diagnosis data processing means preferably displays that an execution condition is established when the running pattern is realized and the execution condition is established.

A self-diagnosis method for a vehicle provided by the invention using this self-diagnosis system includes a vehicle state detecting process of detecting a vehicle state; a data processing process of, when running according to a predetermined running pattern preset in correspondence with a diagnosis object device has been carried out, executing a diagnosis of the diagnosis object device on the basis of a vehicle state detected by the vehicle state detecting process; and a diagnosis data processing process of, being data-transferably in cooperation with the data processing process, obtaining and displaying data used in the data processing process, and the diagnosis data processing process has a step of, on a condition that the diagnosis data processing process is data-transferably in cooperation with the data processing process and the vehicle is run in a predetermined running pattern corresponding to a diagnosis object device in order to execute a diagnosis of the diagnosis object device, displaying that an execution condition is established when the execution condition of the diagnosis corresponding to the running pattern is established.

Also, another self-diagnosis method for a vehicle provided by the invention includes a vehicle state detecting process of detecting a vehicle state; a data processing process of, when running according to a predetermined running pattern preset in correspondence with a diagnosis object device has been carried out, executing a diagnosis of the diagnosis object device on the basis of a vehicle state detected by the vehicle state detecting process; and a diagnosis data processing process of, data-transferably in cooperation with the data processing process, obtaining and displaying data used in the data processing process, and the diagnosis data processing process has a step of, when the diagnosis data processing process is data-transferably in cooperation with the data processing process and the vehicle is run in a predetermined running pattern corresponding to a diagnosis object device in order to a diagnosis of the diagnosis object device, displaying an operating sequence necessary for realizing the running pattern. At this time, the diagnosis data processing process preferably further comprises a step of displaying that an execute condition is established when the running pattern is realized and the execution condition of the diagnosis is established.

According to the invention, because the establishment of execution condition when the self-diagnosis is carried out by the data processing means is displayed by the diagnosis data processing means, the timing of starting and finishing of diagnosis when running according to a running pattern is carried out can be known. As a result, it is possible, without requiring skill and practice, to realize running according to a running pattern, and thereby easily and certainly cause the data processing means to execute a self-diagnosis.

Further, because instructions for achieving running according to a running pattern are displayed by the diagnosis data processing means, it is possible, without requiring skill and practice, to realize running according to a running pattern, and easily and certainly cause the data processing means to execute a self-diagnosis.

DETAILED DESCRIPTION OF THE PREFERRED EMBODIMENTS

A preferred embodiment of a self-diagnosis system for a vehicle according to the invention will now be described.

Figure 1:
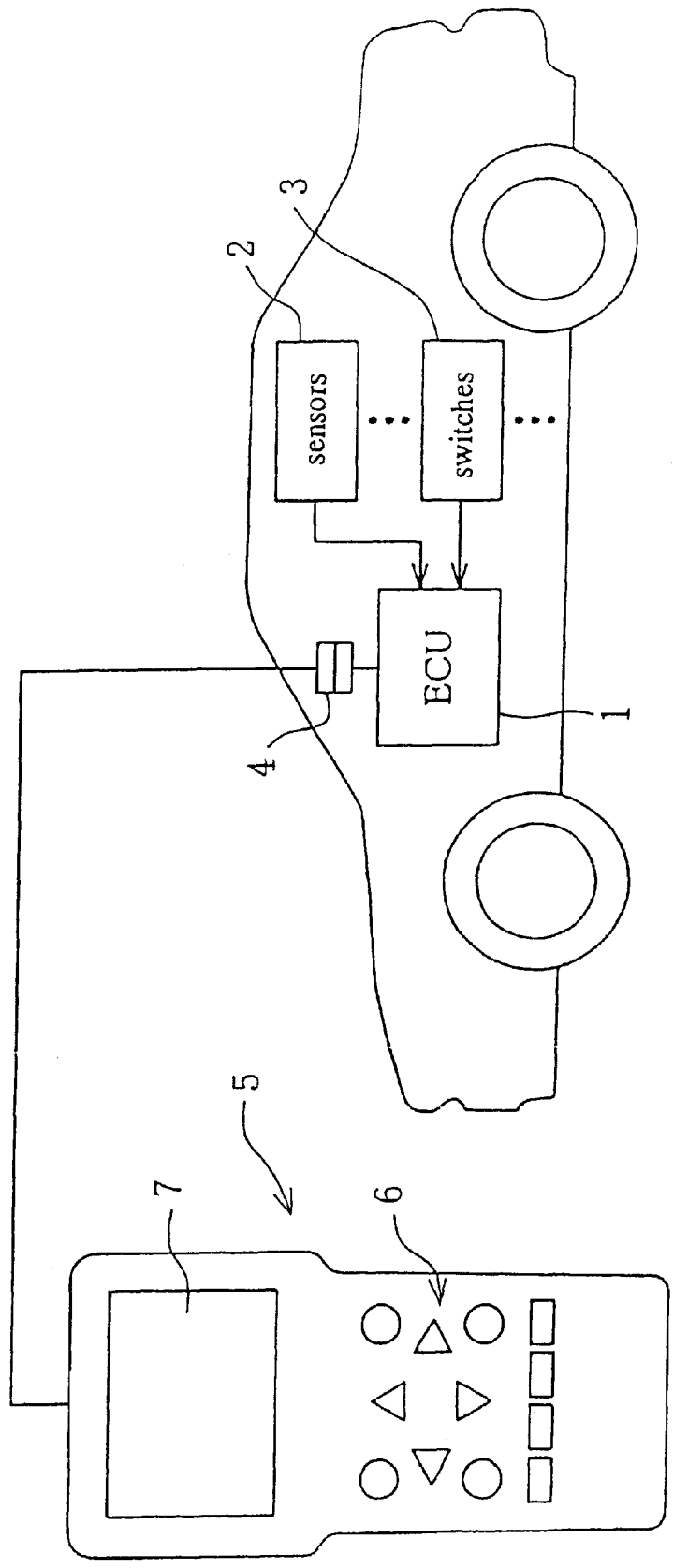
FIG. 1 is a schematic view showing a vehicle self-diagnosis system of a preferred embodiment of the invention.

FIG. 1 is a schematic view of the overall construction of the vehicle self-diagnosis system of this preferred embodiment. In this figure, the reference numeral 1 denotes an ECU (Electronic Control Unit) for executing overall control of an engine and a transmission and so on of a vehicle equipped with the self-diagnosis system. This ECU 1 has input-output devices, memory devices (ROM, RAM, BURAM or the like) for storing control programs and control maps and so on, a central processing unit (CPU), and timer counters, etc. (not shown), and is mounted on a passenger compartment of the vehicle. Various sensors 2 and switches 3 are connected to the input side of the ECU 1, various motors and actuators (not shown) are connected to the output side, and the ECU 1 drive-controls the motors and actuators on the basis of data from the sensors 2 and the switches 3, and thereby executes fuel injection control and ignition timing control of the engine, and speed-changing control of the transmission.

In this preferred embodiment, the ECU 1 functions as data processing means, and the sensors 2 and the switches 3 function as vehicle state detecting means.

The ECU 1 has a self-diagnosis program for devices for emission prevention provided on the vehicle, such as for example an evaporative emission purging device and a catalyst, and, as will be further discussed later, it executes self-diagnosis automatically when the vehicle has run in accordance with a running pattern set for each device and outputs data relating to this self-diagnosis, for example a diagnosis record for each device (history relating to diagnoses, such as whether or not a diagnosis has been executed, and pass/fail of diagnosis results) and running patterns.

Figure 2:
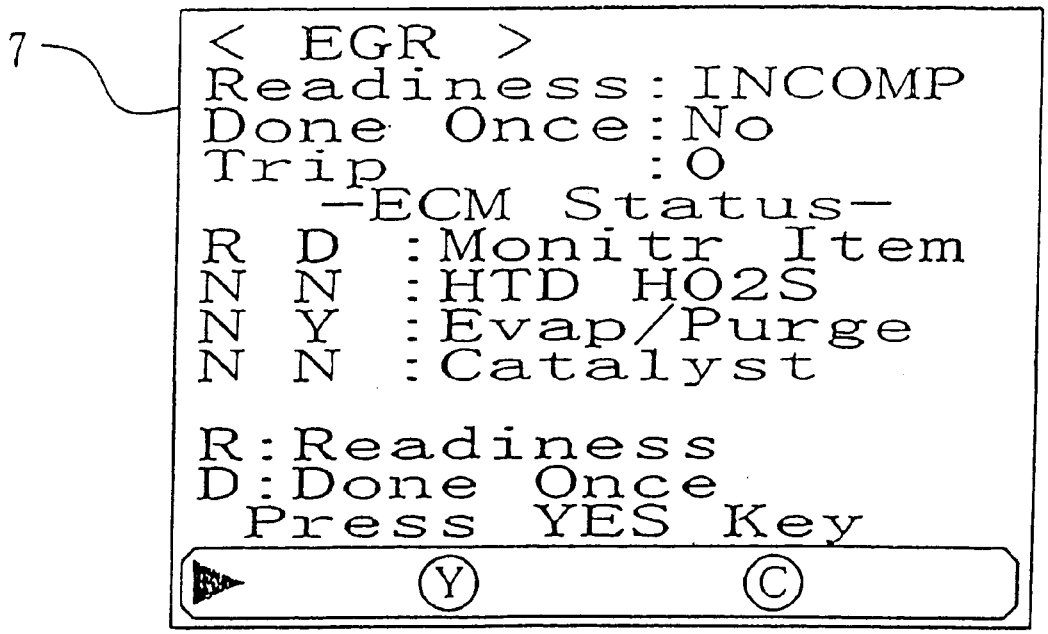
FIG. 2 is a view showing an example of a display on a screen of a self-diagnosis tester.

The ECU 1 is provided with a connector for diagnosis 4, and a self-diagnosis tester 5 can be connected to this connector 4. The self-diagnosis tester 5 has an input part 6 made of numerous switches for inputting commands during testing of devices of the vehicle and also has a display part 7 for displaying a vehicle state, a diagnosis record of a device constituting a test object, and running instructions according to a running pattern, and so on. FIG. 2 shows a display example of the display part 7, and here, a diagnosis record or the like about EGR (exhaust gas recirculation-equipment) is displayed.

Next, testing of devices at the time of a vehicle certification check or the like using a vehicle self-diagnosis system constructed as described above will be explained.

First, when in ordinary traveling of a user, before the time of a vehicle certification check, the running pattern of a device is followed coincidentally, the ECU 1 executes a diagnosis of the device corresponding to that running pattern and stores a diagnosis record, specifically data on that a diagnosis has been executed and whether the result was pass or fail. At the time of the vehicle certification check, a service engineer at a dealer or the like reads out the diagnosis record from the ECU 1, and for undiagnosed devices deliberately effects running according to the corresponding running pattern to cause the ECU 1 to make a diagnosis.

Figure 3:
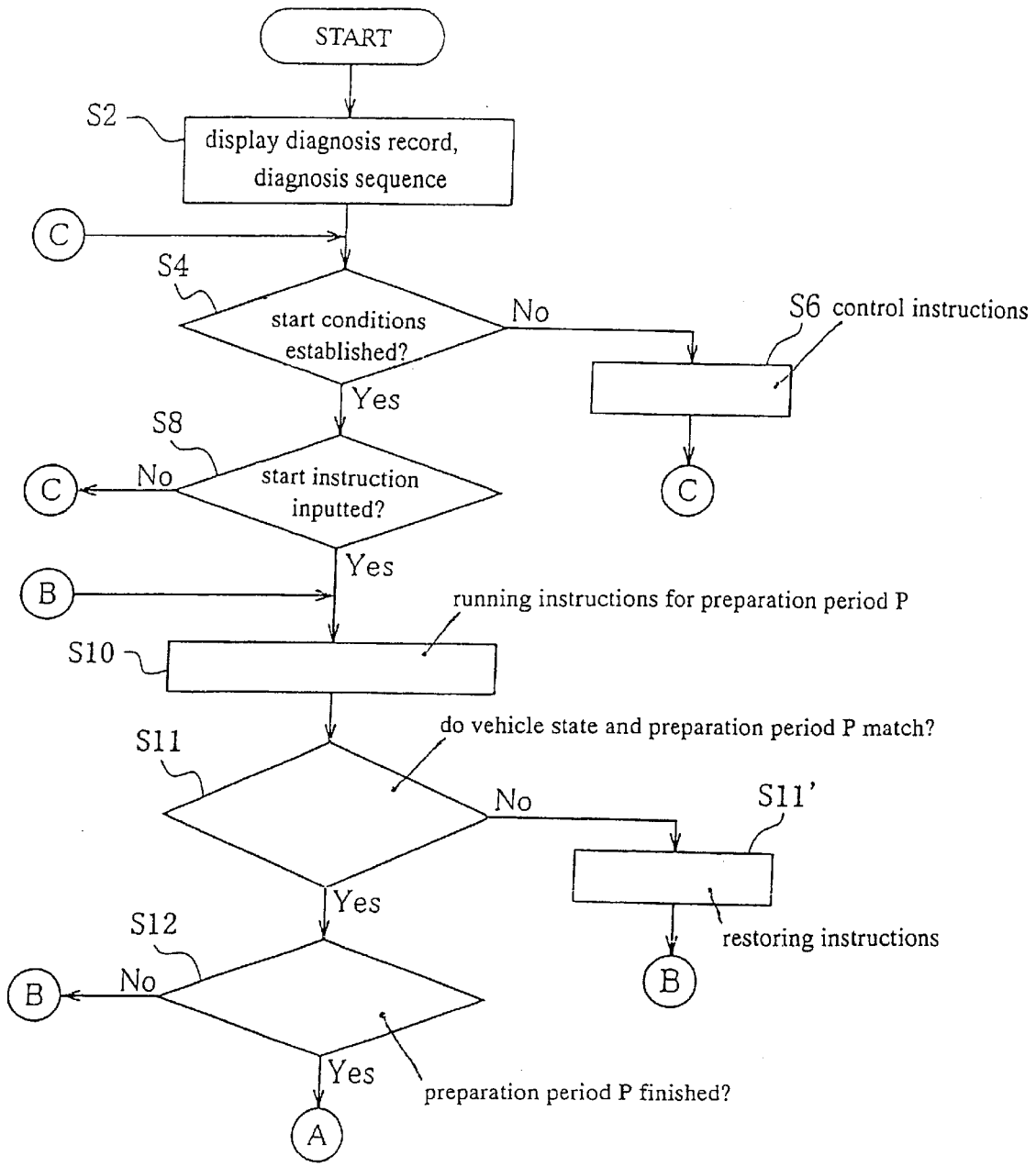
FIG. 3 is a flow chart showing a self-diagnosis routine executed by a self-diagnosis tester.
Figure 4:
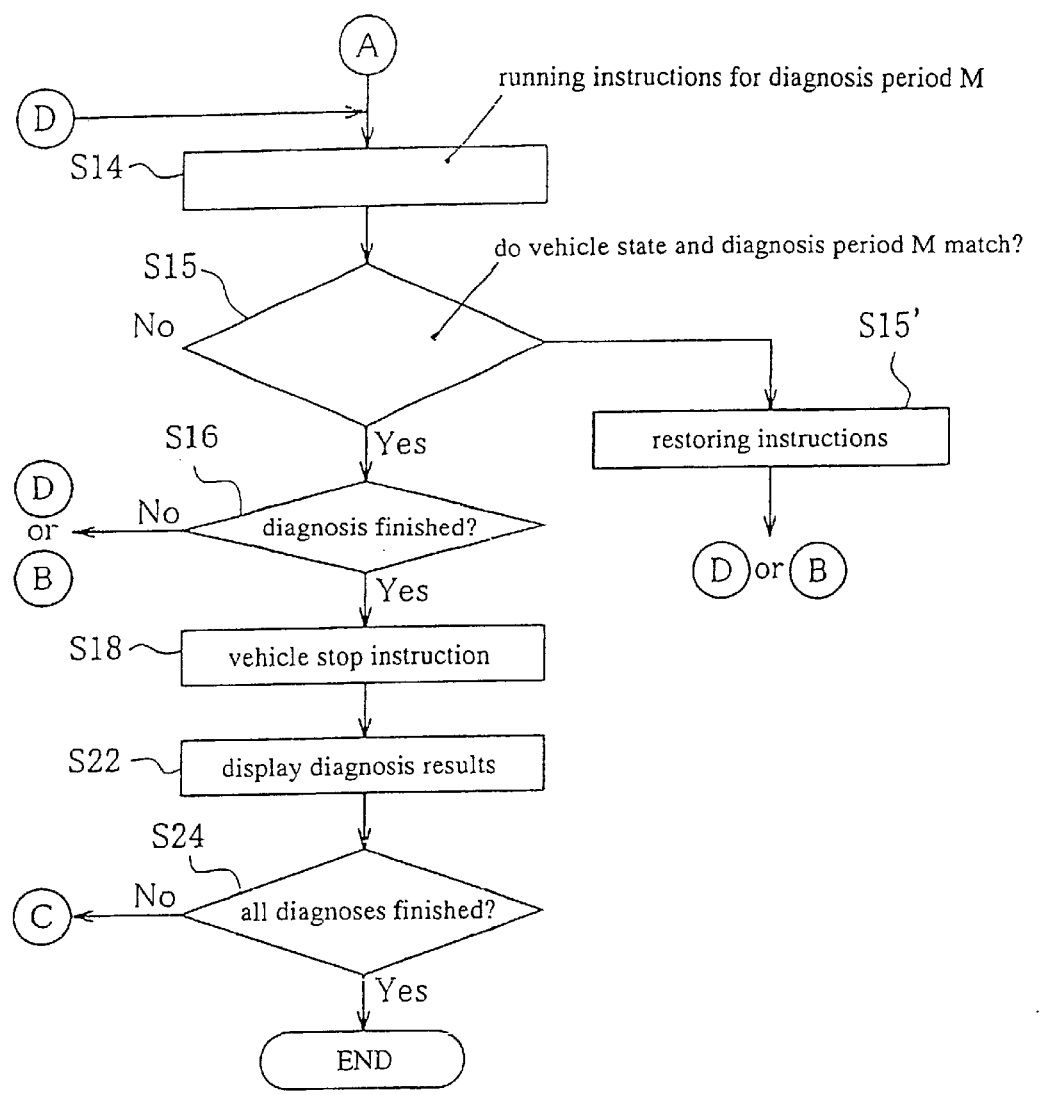
FIG. 4 is another flow chart showing the self-diagnosis routine executed by the self-diagnosis tester.

This diagnosis control is carried out using the self-diagnosis tester 5. When the service engineer connects the self-diagnosis tester 5 to the connector 4 of the ECU 1 and operates the input part 6 in order to diagnose devices, the self-diagnosis tester 5 starts processing in accordance with the self-diagnosis routine shown in FIG. 3 and FIG. 4. First, in step S2, the diagnosis records of the devices are taken in from the ECU 1, and whether or not a diagnosis has been executed and whether the diagnosis result was 'pass' or 'fail' are displayed on the display part 7, and also an optimal diagnosis sequence is determined for the undiagnosed devices and displayed on the display part 7. That is, to diagnose each device, it is necessary to execute a corresponding running pattern, and a diagnosis sequence is determined such that the respective running patterns are carried out efficiently. For example, when, in a certain running pattern, another running pattern is included in its entirety, the diagnosis sequence is determined such that during the execution of said certain running pattern, not only devices corresponding to that running pattern, but also devices corresponding to the other running pattern are diagnosed.

Then, in step S4 it is determined whether or not diagnosis start condition of a first device are satisfied. As the diagnosis start condition, for example, a cooling water temperature, an intake air temperature of the engine, and an air-con (air-conditioner) operating state are set for each device along with a running pattern, and when these condition are satisfied, it is inferred that the running pattern can be executed and a diagnosis made. When the determination in step S4 is NO (negative), in step S6, details of a control operation for satisfying the diagnosis start condition, for example, switching off the air-con, are displayed, and when as a result of this, the diagnosis start condition are satisfied, a determination of YES (affirmative) is made in step S4 and processing moves to step S8.

Figure 5:
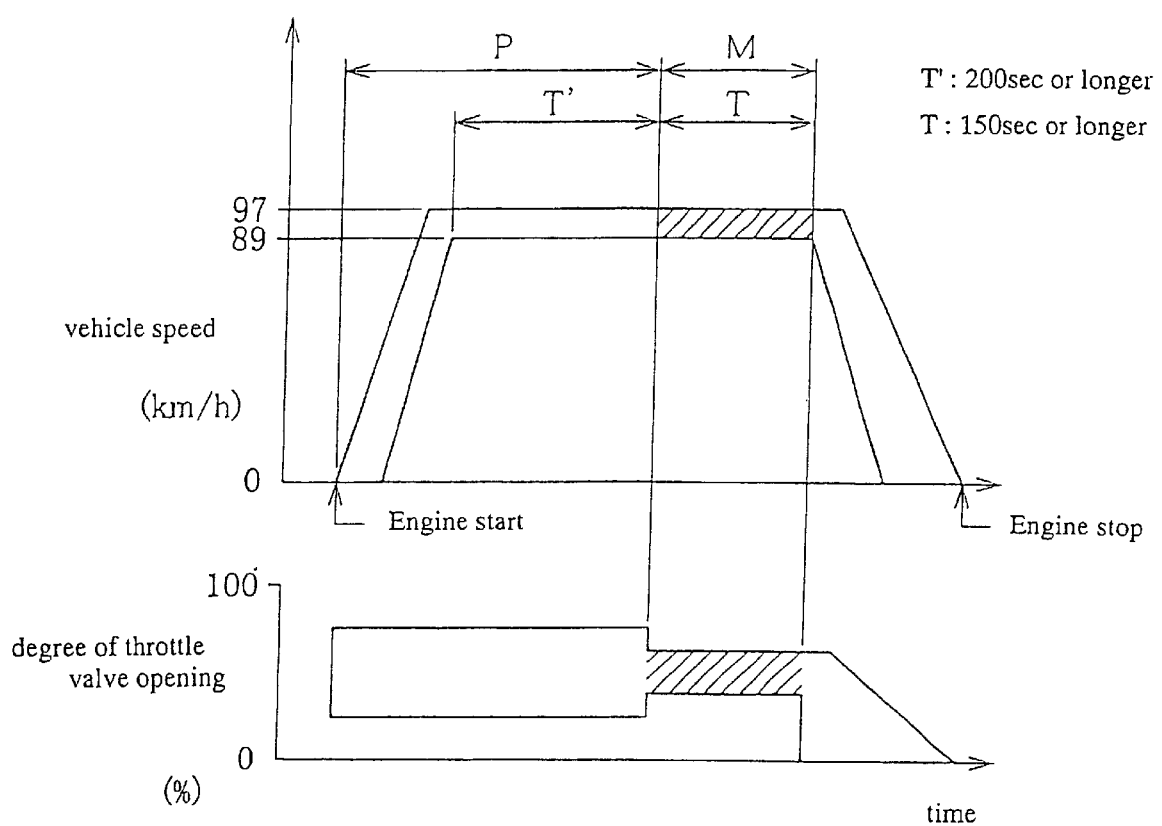
FIG. 5 is a view illustrating a running pattern of an evaporative emission purging device.

In step S8, it is determined whether or not an instruction to start a diagnosis has been inputted by the service engineer. When the determination is YES, then, in step S10 onward, instructions for the execution of a running pattern for diagnosis are given. FIG. 5 shows a running pattern (specifically, vehicle speed and throttle aperture) for when a leak test of an evaporative emission purging device is to be carried out. In this figure, a running pattern of from engine start through running to engine stop is set, and a preparation period P for attaining a state, wherein diagnosis of the purging device is possible and a diagnosis period M (shown with hatching) for actually performing the diagnosis are set within this running. In the figure, in the preparation period P, it is required that the vehicle be accelerated and that a vehicle speed of 89 to 97 km/h then be maintained for at least a time T' (for example, T'=200 secs) with the throttle aperture held to a predetermined range. In the diagnosis period M, it is required that the vehicle speed of 89 to 97 km/h continue to be maintained for at least a time T (for example T=150 secs) and that the throttle aperture be held to a narrower range. This running pattern presupposes a manual transmission, and fifth gear is specified as the gear for the time T' and the time T.

First, in step S10, on the basis of the running pattern data inputted from the ECU 1, running instructions for from engine start to the end of the preparation period P are displayed in sequence on the display part 7, and in the next step S11, it is determined whether or not the present vehicle state matches the running state of the preparation period P. When a YES determination is made, it is then determined, in step S12, whether or not the sequence of the running pattern thus far has all been completed. And when the determination of step S11 is NO, in step S11', a restoring instruction for bringing the vehicle state to match the running pattern of the preparation period P is outputted. When the deviation between the vehicle state and the running pattern of the preparation period P is large, a restoring instruction for repeating the preparation period P from the beginning is outputted.

For as long as the determination of step S12 is NO, the processing of step S10 is repeated, and in accordance with the running instructions outputted in that processing, the service engineer conducts actual running. For instance, in the example of FIG. 5, at the start of running an acceleration instruction is outputted, and, in response to the instruction, acceleration is carried out until a vehicle speed of 89 to 97 km/h is reached; then an instruction to maintain the vehicle speed is outputted, and the actual running also shifts to constant speed running. In other words, in the processing in step S10, step S11, and step S11', it is confirmed that the displayed instruction content has been executed before the running instruction of the next step is displayed, and by this means, it is ensured that the running pattern is executed certainly.

When the determination in step S12 becomes YES, processing proceeds to step S14 and displays a running instruction for the diagnosis period M, and in the next step S15, it is determined whether or not the present vehicle state and the running pattern of the diagnosis period M match. When the determination is YES, processing proceeds to step S16. When the determination in step S15 is NO, in step S15', a restoring instruction for bringing the vehicle state to match the running pattern of the diagnosis period M is outputted. In this case, depending on which of the respective running patterns corresponding to diagnosis of different devices (the running pattern of the purging device shown in FIG. 5, or of a catalyst or an EGR device or the like) and the deviation from the running pattern of the diagnosis period M, the instruction may be to return to the start of the diagnosis period M or to the preparation period P.

In step S16, it is determined, on the basis of diagnosis record data inputted from the ECU 1, whether or not diagnosis has been executed. When the determination is NO, processing returns to step S10, and re-executes the running pattern from the start. When the running pattern is re-executed as such, depending on the type of the device, there are cases wherein an accurate diagnosis result can be obtained by re-executing only the diagnosis period M, and for this kind of device, processing may return from step S16 to step S14. In the display of the running instructions in step S14, step S15, and step S15' also, in the same way as in step S10, step S11, and step S11', it is confirmed that the displayed instruction content has been executed before the running instruction in the next step is displayed. When the running pattern has been reproduced faithfully in accordance with the running instructions of step S14, diagnosis of the device is carried out by the ECU 1 during the diagnosis period M, and for example, if it is a purging device, then it is diagnosed whether or not there is leakage of evaporated fuel gas.

When the determination in step S16 becomes YES, in step S18 an instruction to stop the vehicle is displayed, processing proceeds to step S22, and displays the results of the diagnosis. In the next step S24, it is determined whether or not diagnosis has been finished for all the undiagnosed devices in the diagnosis sequence determined in step S2. When there is a device, of which a diagnosis has not been carried out yet, processing returns to step S4 and the processing described above is repeated, and when diagnosis of all of the devices is finished, a YES determination is made in step S24 and the routine ends.

In this preferred embodiment, the self-diagnosis tester 5, when executing the processing of step S14, functions as diagnosis execution displaying means, and the self-diagnosis tester 5, when executing the processing of step S10 and step S14, functions as running instruction displaying means.

As described above, in this preferred embodiment, because running instructions are displayed on the display part 7 of the self-diagnosis tester 5 (step S10, step S14), when causing the ECU 1 to execute diagnosis processing at the time of a vehicle certification check or the like, a service engineer can realize running according to a running pattern by referring to the displayed running instructions, without requiring skill and practice. Further, during running, the service engineer can easily recognize the timing of starting and ending of a diagnosis period M (starting and ending of diagnosis by the ECU 1) on the basis of the displayed running instructions. Even when, for example, as in the case of the throttle aperture shown in FIG. 5, a more strict condition is required in a diagnosis period M than in a preparation period P or the like, the service engineer, knowing the starting and ending of the diagnosis period M, can with certainty realize running which satisfies the requirement.

By effecting correct running like this, it is possible to cause the ECU 1 to execute diagnosis easily and certainly, and it is possible to prevent the need for re-runs caused by failures of diagnosis and perform testing of devices efficiently. Furthermore, because even if a diagnosis fails, a suitable restoring instruction is outputted (step S11', step S15'), the service engineer can execute a re-run smoothly just by following that instruction.

At the time of execution of a running pattern, because the execution of instruction content displayed on the display part 7 is confirmed before the next running instruction is displayed (step S10, step S14), running according to the running pattern can be made all the more certain.

Also, when there are a plurality of undiagnosed devices, because a diagnosis sequence is determined such that the respective running patterns are carried out efficiently (step S2), the overall working time needed for the test can be shortened and the testing can thus be made still more efficient.

In addition, although when running according to the instructions is not carried out and diagnosis by the ECU 1 is not executed and the running pattern must be re-executed from the beginning (step S20), because there is no repeating of the processing for determining whether the diagnosis start condition are established (step S4), the execution of wasteful processing is prevented and testing is made more efficient in this way also.

When the constructions of the ECU 1 and the self-diagnosis tester 5 of this preferred embodiment are compared with those of related art, the ECU 1 can be obtained just by adding the function of outputting data relating to self-diagnosis, and the self-diagnosis tester 5 can be obtained just by adding the function of displaying running instructions and the like on the basis of data from the ECU 1, and in both cases, the change can be made by way of changes to control programs. Further, because an already existing connector for diagnosis 4 is utilized for the data transmission, there is also no need for a new communication line to be provided. Thus, the various effects and benefits described above can be obtained by means of minimal specification changes, and an increase in manufacturing cost can be prevented.

The description of the preferred embodiment ends here, but the invention is not limited to this preferred embodiment. For example, although in the preferred embodiment as described above, the invention was applied to a self-diagnosis system having emission prevention devices as its objects of diagnosis, the invention can be similarly applied to any devices for which at the time of diagnosis, it is necessary that running be carried out in accordance with a predetermined running pattern, and can thus also for example be applied to self-diagnosis systems for diagnosing devices for engine fuel injection control and ignition timing control, transmission gear-changing control, and ABS (Anti-Lock Braking) control.

What is claimed is:

1. A self-diagnosis system for a vehicle for diagnosing states of devices mounted in the vehicle, comprising:
   vehicle state detecting means for detecting a vehicle state;
   data processing means for executing a diagnosis of a diagnosis object device on the basis of a predetermined running pattern preset in correspondence with the diagnosis object device and a vehicle state detected by the vehicle state detecting means when the vehicle is run according to the running pattern; and
   diagnosis data processing means, data-transferably connected to the data processing means, for obtaining and displaying data from the data processing means,
   wherein the diagnosis data processing means determines whether or not a diagnosis execution condition for the diagnosis object device corresponding to the running pattern is established and displays an indication of whether or not the execution condition is established.

2. A self-diagnosis system according to claim 1, wherein the execution condition is at least one of a cooling water temperature, an intake air temperature of the engine, and an air-conditioner operating state, these executing conditions being set for each device along with the running pattern.

3. A self-diagnosis system according to claim 1, wherein, when the diagnosis data processing means determines that the diagnosis execution condition is not established, the diagnosis data processing means displays a control operation for establishing the execution condition.

4. A self-diagnosis system according to claim 1, wherein the diagnosis data processing means obtains the diagnosis records of the diagnosis object device from said data processing means and determines an optimal diagnosis sequence for an undiagnosed device and displays the optimal diagnosis sequence.

5. A self-diagnosis system according to claim 4, wherein after the execution condition is established, the diagnosis data processing means determines whether an instruction to start a diagnosis has been inputted and, if so, displays instructions for the execution of the running pattern for diagnosis.

6. A self-diagnosis system according to claim 5, wherein the running pattern is set from engine start to engine stop, a preparation period for attaining a state that allows the diagnosis of the diagnosis object device and a diagnosis period for performing the diagnosis being set within the running pattern.

7. self-diagnosis system according to claim 6, wherein the diagnosis data processing means displays a running instruction from engine start to the end of the preparation period on the basis of the diagnosis records of the diagnosis object device from the data processing means.

8. A self-diagnosis system according to claim 6, wherein the diagnosis data processing means determines whether or not the present vehicle state and the running pattern of the diagnosis period match and, if not, displays a restoring instruction for bringing the vehicle state to match the running pattern of the diagnosis period.

9. A self-diagnosis system for a vehicle for diagnosing states of devices mounted in the vehicle, comprising:
   vehicle state detecting means for detecting a vehicle state;
   data processing means for executing a diagnosis of a diagnosis object device on the basis of a predetermined running pattern preset in correspondence with the diagnosis object device and a vehicle state detected by the vehicle state detecting means when the vehicle is run according to the running pattern; and
   diagnosis data processing means, data-transferably connected to the data processing means, for obtaining and displaying data from the data processing means,
   wherein the diagnosis data processing means determines an operating sequence for an undiagnosed device and displays the operating sequence necessary for realizing the running pattern associated with the undiagnosed device.

10. A self-diagnosis according to claim 9, wherein the diagnosis data processing means determines whether or not a diagnosis execution condition for the diagnosis object device corresponding to the running pattern is established and displays an indication of whether or not the execution condition is established.

11. A self-diagnosis method for a vehicle for diagnosing states of devices mounted in the vehicle, comprising:

a vehicle state detecting process of detecting a vehicle state;

a data processing process of, when the vehicle is run according to a predetermined running pattern preset in correspondence with a diagnosis object device, executing a diagnosis of the diagnosis object device on the basis of a vehicle state detected by the vehicle state detecting process; and a diagnosis data processing process of, being data-transferably in cooperation with the data processing process, obtaining and displaying data used in the data processing process, wherein the diagnosis data processing process determines whether or not a diagnosis execution condition for the diagnosis object device corresponding to the running pattern is established and displays an indication of whether or not the execution condition is established.

12. A self-diagnosis system according to claim 11, wherein the determining step of the diagnosis data processing process determines at least one of a cooling water temperature, an intake air temperature of the engine, and an air-conditioner operating state, these executing conditions being set for each device along with the running pattern.

13. A self-diagnosis method for a vehicle for diagnosing the state of a device mounted in the vehicle, comprising:

a vehicle state detecting process of detecting a vehicle state;

a data processing process of, when the vehicle is run according to a predetermined running pattern preset in correspondence with a diagnosis object device, executing a diagnosis of the diagnosis object device on the basis of a vehicle state detected by the vehicle state detecting process; and a diagnosis data processing process of, being data-transferably in cooperation with the data processing process, obtaining and displaying data used in the data processing process, wherein the diagnosis data processing process determines an operating sequence for an undiagnosed device and displays the operating sequence necessary for realizing the running pattern associated with the undiagnosed device.

14. A self-diagnosis method for a vehicle according to claim 13, wherein the diagnosis data processing process further includes the step of determining whether or not a diagnosis execution condition for the diagnosis object device corresponding to the running pattern is established and displaying an indication of whether or not the execution condition is established.

* * * * *